USOO6302263B1

United States Patent
Bennett et al.

(10) Patent No.: US 6,302,263 B1
(45) Date of Patent: Oct. 16, 2001

(54) APPARATUS AND METHOD FOR THE CONTROLLED LUBRICATION AND CLEANING OF CONVEYORS

(75) Inventors: Scott P. Bennett, Stillwater; James M. Zell, Northfield, both of MN (US)

(73) Assignee: Ecolab, Inc., St. Paul, MN (US)

( * ) Notice: Subject to any disclaimer, the term of this patent is extended or adjusted under 35 U.S.C. 154(b) by 0 days.

(21) Appl. No.: 09/415,941

(22) Filed: Oct. 8, 1999

(51) Int. Cl.[7] .................................................. B65G 45/00
(52) U.S. Cl. ............................................ 198/495; 198/500
(58) Field of Search ..................................... 198/500, 495

(56) References Cited

U.S. PATENT DOCUMENTS

| | | |
|---|---|---|
| 4,226,325 | 10/1980 | Vandas . |
| 4,262,776 * | 4/1981 | Wilson et al. ........................ 198/500 |
| 4,274,509 | 6/1981 | Thomson et al. . |
| 4,368,803 * | 1/1983 | Dombrowski et al. .............. 198/500 |
| 4,627,457 * | 12/1986 | Bird et al. ............................ 198/500 |
| 4,839,067 * | 6/1989 | Janzen ................................. 198/500 |
| 4,930,600 * | 6/1990 | Kumar et al. ........................ 198/500 |
| 5,067,590 | 11/1991 | King, Sr. et al. . |
| 5,186,280 * | 2/1993 | Mattcheck ............................ 198/500 |
| 5,247,957 | 9/1993 | Weisse . |
| 5,289,899 | 3/1994 | King . |
| 5,372,243 | 12/1994 | King . |
| 5,433,679 | 7/1995 | Szymczak et al. . |
| 5,758,761 | 6/1998 | Selbertinger et al. . |
| 5,772,003 * | 6/1998 | Hunt ..................................... 198/495 |
| 5,873,946 | 2/1999 | Hantmann . |

FOREIGN PATENT DOCUMENTS

| | | |
|---|---|---|
| 0 079 152 A1 | 5/1983 | (EP) . |
| 2 174 018 A | 10/1986 | (GB) . |
| WO 95/08499 | 3/1995 | (WO) . |

* cited by examiner

Primary Examiner—Douglas Hess
(74) Attorney, Agent, or Firm—Merchant & Gould P.C.

(57) ABSTRACT

A method for automatically cleaning and lubricating conveyor belt systems is disclosed. A microprocessor controlled control unit senses the movement of the conveyor belt and the presence of items, for example bottles, on the conveyor. The control unit initiates the application of lubricant, detergent and rinse water onto the conveyor according to the speed of the conveyor, the presence of items and the time passed since the previous application. If the conveyor is stationary, that is, is not in motion, no lubricant or cleaning solution is applied. If the conveyor is moving but no items are on the belt, a reduced amount of lubricant is dispensed onto the conveyor system. The conveyor cleaning and lubricating process may be carried out during normal production operations.

9 Claims, 3 Drawing Sheets

APPARATUS AND METHOD FOR THE CONTROLLED LUBRICATION AND CLEANING OF CONVEYORS

FIELD OF THE INVENTION

The invention relates to a new and improved apparatus and method for cleaning and lubricating conveyors using a microprocessor controlled control system. The control system senses the activity of the conveyor and the presence of items on the conveyor, and in return lubricates and washes the conveyor as needed. This automated system also reduces the amount of cleaning labor needed, as well as reduces the amount of wasted cleaning and lubricating supplies.

BACKGROUND OF THE INVENTION

Conveyors commonly used in the food and packaging industries (in particular soft drink manufacturing facilities, breweries, fruit juice manufacturing facilities, dairies, etc.) generally require periodic cleaning in order to maintain the conveyor in a sanitary condition. This cleanliness requirement in turn requires the application of various cleaning ingredients such as detergents, sanitizers, bactericides, slimicides, etc. A simple, yet very time and labor intensive practice is to apply these cleaning ingredients to the conveyor system manually, either by high pressure hot water, steam, or other methods. Additionally, there is a tendency in manual cleaning to over-apply and waste the cleaning products. This manual practice is both expensive, cumbersome and dangerous and may not provide an adequately clean conveyor belt. The art recognizes a need for improved methods and apparatus. U.S. Pat. No. 5,372,243 provides an alternative to the above described cleaning method. King teaches a pneumatically controlled cleaning and rinsing system for conveyors. The valves for providing cleaning and rinsing ingredients are pneumatically actuated, as are the timers and sequencer valves. Pneumatically controlled and actuated equipment is stressed because of the desire to eliminate corrosion of electrical equipment and components in wet environments.

Others have provided alternate conveyor cleaning and/or lubricating systems to replace systems that include electrical equipment. U.S. Pat. No. 5,129,481 describes an apparatus and method for lubricating conveyors and belts used in the food industry comprising a device including valves which are alternately opened and closed by an actuating device driven from the conveyor movement. The valves supply a lubricant which is fed to output nozzles for spraying onto the conveyors for lubricating purposes, and the valves will only feed lubricant when the conveyor is moving. Alternately, U.S. Pat. No. 5,289,899 teaches an air-driven delay valve or relay, which is driven from the conveyor system, and which connects to a counter which controls the valve that passes lubricant in a pulsating or intermittent fashion.

However, pneumatically controlled systems, such as those described above, can be inaccurate, for example, in their time measurement and fluid dispensing, leading to ineffective cleaning and/or lubricating of the conveyor and wasted supplies. A substantial need exists for a cleaning and lubricating system for conveyors that is simple, accurate, versatile, reliable, and is easy to maintain.

SUMMARY OF THE INVENTION

The present invention relates to a new and improved apparatus and method for cleaning and lubricating conveyor systems using a microprocessor controlled control system. The control system senses movement of the conveyor belt and the presence of any items, such as cans, bottles, or food products, on the conveyor belt, and in return either cleans or lubricates the conveyor as needed. This automated system reduces the amount of labor needed to perform these critical tasks, as well as reduces the amount of wasted cleaning and lubricating supplies.

In particular, the present invention relates to a conveyor system that includes the combination of a conveyor system, a washing system, and a lubrication system. The conveyor system is for transporting an object, with the conveyor system including a conveyor belt having a front side and a back side, and a drive mechanism for providing movement to the belt. The washing system is for rinsing and washing the conveyor belt and includes a water source, a detergent source, a mixing chamber to mix the water and the detergent to form a cleaning solution, and an applicator for application of the cleaning solution onto the belt. In some embodiments, the applicator is a spray nozzle. The application of the cleaning solution onto the belt is controlled by a control system, which comprises a microprocessor adapted to provide a signal to open the applicator to provide rinse or cleaning solution onto the belt. The lubrication system is for lubricating the conveyor belt to improve belt tracking and to extend the useable life of the belt. The lubrication system includes a lubricant source and an applicator for application of the lubricant onto the belt. In some embodiments, the applicator is a spray nozzle. The application of the lubricant onto the belt is controlled by a lubricant control system that includes a first sensing system to sense movement of the belt, a second sensing system to sense presence of items on the belt, and a control system comprising a microprocessor that receives signals from the sensing systems and sends signals to open the applicator to provide lubricant onto the belt on a predetermined, timed basis.

The amount of lubricant applied to the belt is dependent on the signals from the first and second sensing systems. In particular, if the first sensing system confirms movement of the belt and the second sensing system confirms an object, the microprocessor provides a signal to provide lubricant so that a first amount of lubricant is fed from the lubricant source and is applied onto the conveyor. If the first sensing system confirms movement of the belt but the second sensing system does not confirm the presence of an object, the microprocessor provides a signal to provide lubricant so that a second amount of lubricant is fed from the lubricant source and is applied to the conveyor, the second amount of lubricant being less than the first amount. If the first sensing system does not confirm movement, whether or not items are present on the belt, the microprocessor does not provide a signal to apply lubricant.

In a further aspect of the invention, the washing system comprises a microprocessor to provide a signal to apply a rinse or cleaning solution to the conveyor belt for a predetermined time interval. Typically, this washing process occurs after any production run on the conveyor system is complete. The washing process generally includes a first rinse step, a cleaning step, and a second rinse step.

The invention will be further described in relation to the included drawings.

DETAILED DESCRIPTION

The invention relates to a new and improved apparatus and method for cleaning and lubricating conveyors using a microprocessor controlled control system. The control system senses the activity of the conveyor and the presence of items on the conveyor, and in return either cleans or lubricates the conveyor as needed. If the control system only senses movement of the conveyor but no item on the conveyor, only a small amount of lubricant is applied to the conveyor sufficient to keep the conveyor belt properly lubricated.

Figure 1:
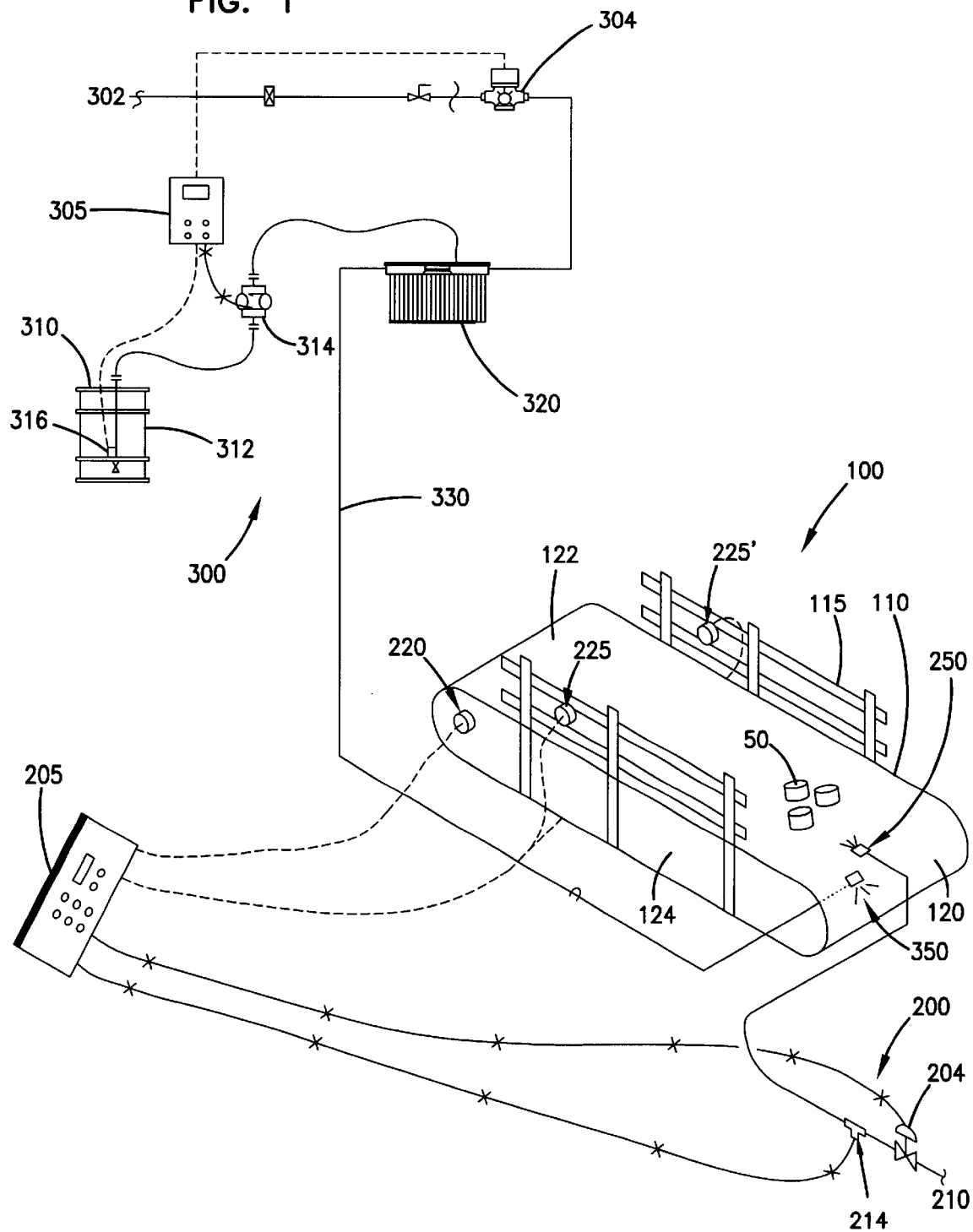
FIG. 1 is a schematic perspective view showing an apparatus of this invention, including a conveyor system.

Referring now to the Figures, wherein like elements are represented by like numerals throughout the various views, FIG. 1 shows a general arrangement of a conveyor maintenance system 100 that has a lubrication system 200 and a washing system 300. The apparatus 100 is used for lubricating and washing a conveyor system 110, although not necessarily simultaneously.

Conveyor system 110 includes a conveyor belt 120 having a front side 122 and a back side 124, and a structure 115 to support belt 120. Front side 122 of belt 120 is the side on which items, such as bottles or cans 50, are carried. Back side 124 is the inner side when belt 120 is formed as a loop (as shown in FIG. 1), and back side 124 typically contacts a drive mechanism (not shown). Conveyor systems, such as those designated as conveyor system 110, are well known.

Washing system 300 has a water source 302, a detergent source 310, and a device in which the water and the detergent are mixed. In FIG. 1, such a mixing device is shown as mixing chamber 320. Water source 302 is typically a potable water source and is generally supplied at about 5 to 20 gallons per minute at a pressure of about 60 to 125 psi, although other volumetric rates and pressures could be used. Detergent source 310 can be a drum 312, such as a 55 gallon drum, or a larger storage tank. The detergent may be any solution, mixture, component or the like used for cleaning, disinfecting, degreasing, etc. A low level alarm 316 may be used within detergent source 310 to warn of low detergent supply. A controller 305 is used to control valves 304, 314 which allow feed from water source 302 and detergent source 310, respectively, to flow to mixing chamber 320. Once the water and detergent are mixed in a mixing device, for example, mixing chamber 320, the cleaning mixture or solution is applied to the conveyor belt. In FIG. 1, the solution is supplied via delivery pipe 330 to a detergent applicator, shown as spray nozzle 350 (shown in phantom in FIG. 1). Spray nozzle 350 applies cleaning solution to back side 124 of conveyor belt 120. Optionally, the cleaning solution could be applied to front side 122 of conveyor belt 120 or other areas of conveyor system 110, such as structure 115.

In some steps during the washing procedure, it may be desired to provide a water-only rinse of the conveyor system 110; that is, no detergent is used. The process of waterwashing is considered to comprise rinsing. Rinsing is performed in the same manner as washing, except that typically no detergent is added to provide the solution. There may, however, be additives provide to the water source to produce a rinse solution. Often, a three-step process is used: a first rinse step, a washing or cleaning step, and a second rinse step.

The washing process, which includes the steps of applying rinse and/or cleaning solution, may be applied to conveyor belt 120 at predetermined intervals, for example, a one to three minute rinse after every hour of operation. Rinse and/or cleaning solution may also, or alternately, be applied at the end of the production run that uses conveyor system 110, for example, at the end of the work day or shift. The conveyor belt 120 may continue to run (i.e., move) during the cleaning operation or may be stopped.

Generally, no sensors are needed in washing system 300 if it is desired to rinse and/or washing conveyor belt 120 after its use. The washing may be activated by, for example, a manual switch after the production run has been completed.

Figure 3:
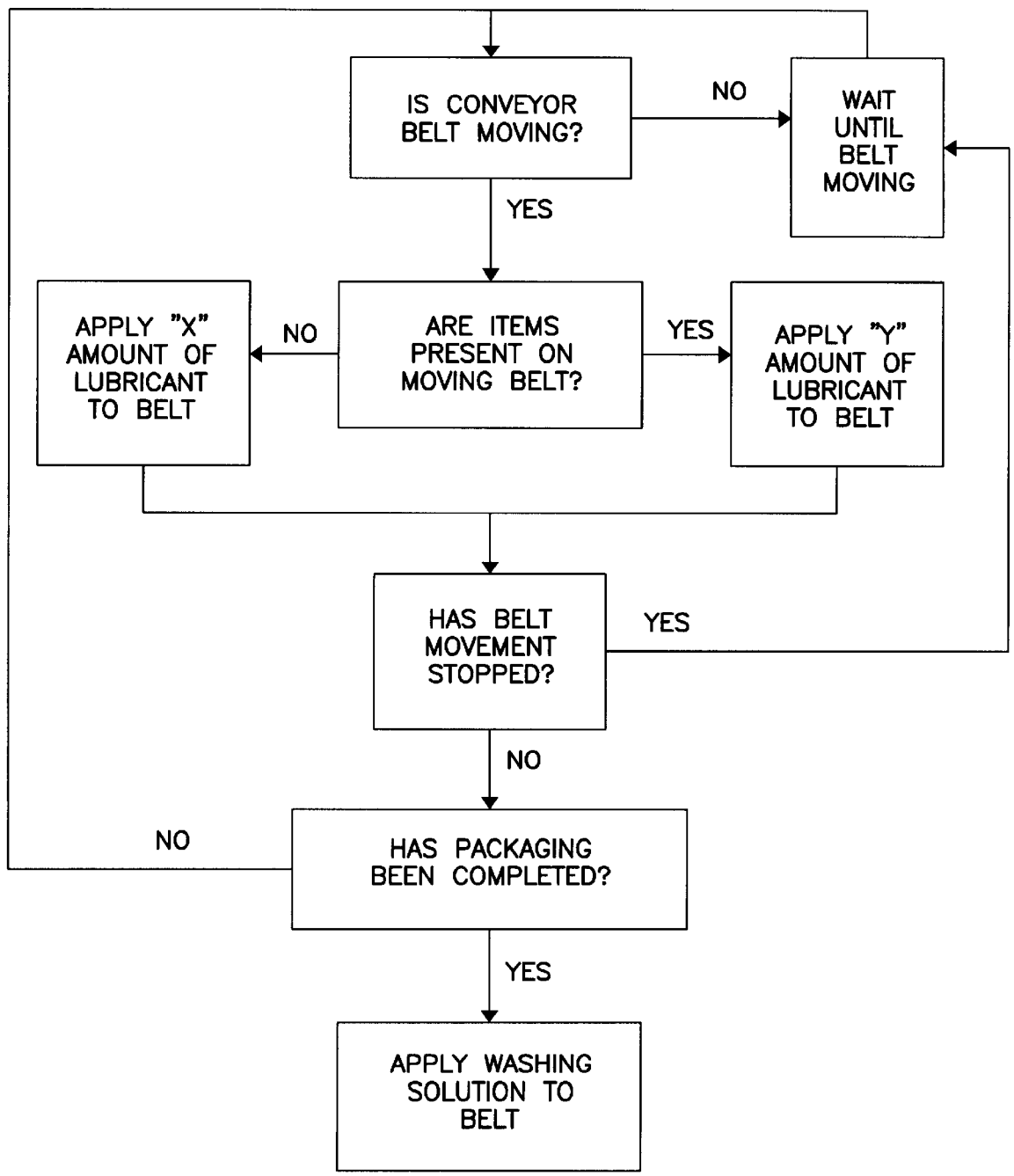
FIG. 3 is a block diagram illustrating the logic used by the apparatus of this invention to provide the method for the lubrication and cleaning of the conveyor system.

Lubrication system 200 has a lubricant source 210 and a lubricant applicator, such as spray nozzle 250, to apply lubricant to front side 122 of conveyor belt 120. Optionally, the lubricant could be applied to back side 124 of conveyor belt 120. In accordance with the present invention, the amount of lubricant applied to belt 120 is dependent on both the movement of conveyor belt 120 and the presence of items, such as cans 50, on belt 120. If belt 120 is in motion and items are present on the belt, a first amount of lubricant is applied to front side 122 of belt 120. If belt 120 is in motion and no items are present, a second amount of lubricant is applied, with the second amount of lubricant being less that the first amount. If no movement of belt 120 is sensed, whether or not any items are present on belt 120, no lubricant is applied. This series of inquiries and resulting actions is illustrated in FIG. 3, which is a block diagram of the logic used to determine the application of the lubricant.

Movement of belt 120 is sensed by a sensor 220, which in FIG. 1 is positioned to monitor back side 124 of belt 120. Presence of items, such as cans 50, is sensed by sensor 225. FIG. 1 shows two sensors 225, 225' on opposites sides of belt 120 and mounted on structure 115. Although only one sensor 225 for monitoring the belt and two sensors 225, 225' for monitoring presence of items are shown, any number of sensors can be used. Sensors 220, 225, 225' may be any sensors capable of sensing movement and/or presence of items; usable sensors include well known devices such as motion or vibration detectors, or laser, IR or other sensors. In another embodiment, the sensor may be directly wired or otherwise connected to the conveyor system's motor.

Sensors 220, 225, 225' are connected to a control system 205 which includes a microprocessor (not shown) therein. Signals from sensors 220, 225, 225' are processed by the microprocessor, which then sends a signal to valve 204 which controls supply of lubricant from source 210 to nozzle 250.

The microprocessor usable in the control system 205 of the present invention may be a programmable general purpose microprocessor, also known as a "PLC" or a programmable logic controller. 'Ladder logic' is typically the format used when programming this microprocessor. The microprocessor is incorporated into the control system 205 and may be attached to equipment such as a monitor, touch screen, keyboard, or a mouse. The microprocessor is then also connected to the sensors and valves.

If sensor 220 provides a negative signal to control system 205 indicating that belt 120 is not moving, control system 205 provides a signal to close valve 204 so that no lubricant is applied to belt 120. If sensor 220 provides a positive signal indicating that belt 120 is in motion, and sensor 225 provides a positive signal indicating that items such as cans 50 are present on belt 120, control system 205 provides a signal to open valve 204 so that a first amount of lubricant flows to nozzle 250 and is applied to belt 120. If sensor 220 provides a positive signal indicating that belt 120 is moving, but sensor 225 provides a negative signal indicating that no items are present on belt 120, control system 205 provides a signal to open valve 204 partially so that a second amount of lubricant flows to nozzle 250 and is applied to belt 120. The second amount of lubricant allowed through valve 204 and applied by nozzle 250 is less that the first amount, because no lubrication is need between items and the belt if no items are present. The lubrication desired, when no items are present, is a minimal amount, simply to reduce friction and maintain flexibility of the belt.

Lubricant source 210 can be any container such as a drum, a large storage tank, or can be supplied by a delivery pipe from a remote location. Valve 204 is preferably a pneumatic (air actuated) valve and is controlled by signals from control system 205. An air injection tee 214 may be included in lubricant system 200 to provide a stream of air to be mixed with the lubricant before it is applied to belt 120.

Figure 2:
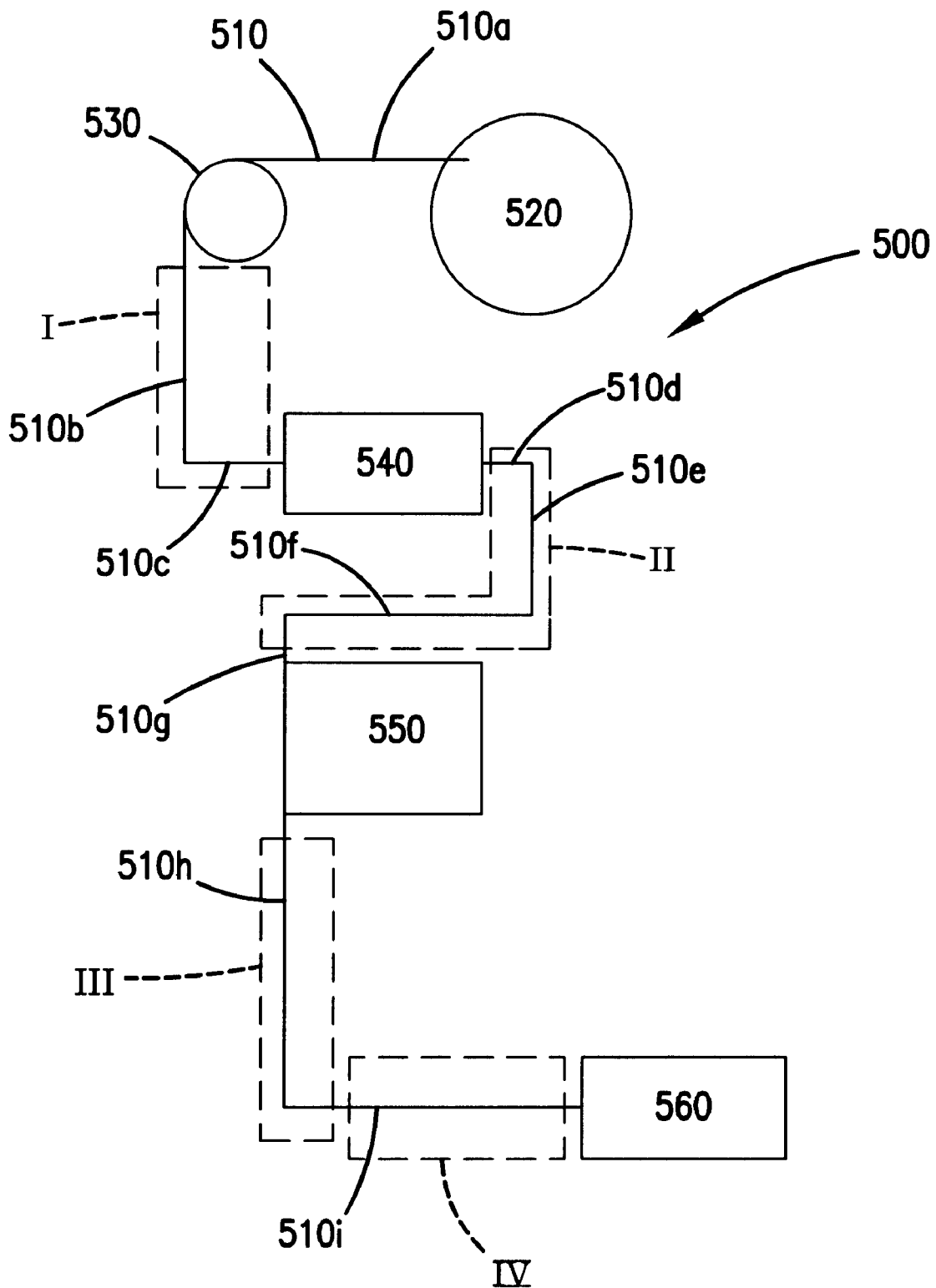
FIG. 2 is a simplified schematic diagram in top view of a conveyor system having multiple zones.

Referring now to FIG. 2, a conveyor system 500 is typically divided into multiple zones, generally at least two zones, often more than two zones. FIG. 2 shows conveyor system 500 with four zones. A "zone" is a region or length of conveyor and each zone typically has its own conveyor belt, support framework, conveyor track, and drive mechanism for the conveyor belt. Often, a zone may have multiple conveyor belts that may or may not have their own drive mechanism.

FIG. 2 is a top simplified schematic diagram of conveyor system 500 divided into four zones. Conveyor system 500 includes a filler station 520 where a container, such as a can or bottle, is filled. Conveyor belt 510 moves the container from one station, such as filler station 520, to the next station. From filler 520, the container progresses along conveyor belt 510 to seamer station 530 where the container is sealed, e.g., capped. From seamer 530, the container progresses through a warmer station 540. After warmer 540, the container progresses to accumulation area 550, where multiple containers are stored until they are ready to be sent to caser station 560. At caser 560, the containers are packaged for delivery and distribution, for example, cans may be packaged in plastic 6-pack rings, or in paperboard boxes for 12 and 24 packs.

Conveyor system 500 is divided into four zones I, II, III, and IV, which extend from seamer 530 to caser 560. Zone I extends from after seamer 530 to warmer 540, but could optionally start at filler 520. Zone II extends from after warmer 540 to accumulation area 550. After accumulation area 550, conveyor system 500 is divided into two zones, III and IV, which extend to caser station 560. In accordance with the present invention, each zone may include a system for controlling the lubricant and a system for controlling the rinse and cleaning solutions, the systems may, however, be shared with one or multiple additional zones. In a preferred embodiment, a single control system is capable of controlling all lubricant systems, without the need for an individual control system for each lubrication system.

It should be noted that although FIG. 2 is schematically drawn showing a single conveyor belt 510 extending the length of conveyor system 500, conveyor belt 510 actually may include multiple belts. Typically, each bend or turn in the system requires a new belt. For example, conveyor belt 510*a* extends from filler station 520 to seamer station 530. From seamer 530, two belts 510*b*, 510*c* extend to warmer 540. Both belts 510*b*, 510*c* are within zone I. From warmer 540, belts 510*d*, 510*e*, 510*f* and 510*g* in zone II extend to accumulation area 550. Belt 510*h* in zone III and belt 510*l* in zone IV extend to caser station 560. Each belt 510*a*, 510*b*, etc., may have its own drive mechanism (not shown), or multiple belts may share a drive mechanism.

A single control system with a microprocessor can be used to control all lubricant systems that apply lubricant to belts 510*a*, 510*b*, etc. Similarly, a single control system with a microprocessor can be used to control all washing systems.

The above-captioned drawings, explanation and specification describe the elements of the conveyor system lubrication and washing system and its method of use. While a variety of embodiments can be made without departing from the spirit and scope of the invention, the invention resides in the claims hereinafter appended.

We claim:

1. A combination lubricating and cleaning system for an operating conveyor system, the system comprising:
   (a) a conveyor for transporting an object, the conveyor comprising a belt having a front side and a back side, driven by a drive mechanism;
   (b) a washing system comprising a water source, a detergent source, a mixer to mix the water and the detergent to form a cleaning solution, a detergent applicator to apply the cleaning solution onto the belt, and a control system, the control system comprising a microprocessor adapted to apply the cleaning solution onto the belt; and
   (c) a lubrication system comprising a lubricant source, a lubricant applicator to apply lubricant onto the belt, and a lubricant control system, the lubricant control system comprising:
      (i) a first sensing system to sense movement of the belt;
      (ii) a second sensing system to sense presence of items on the belt; and
      (iii) a control system comprising a microprocessor adapted to open the nozzle to spray lubricant onto the belt,
      wherein if the first sensing system confirms movement of the belt and the second sensing system confirms an object, the microprocessor provides a signal to open the lubricant applicator so that a first amount of lubricant is fed from the lubricant source and is applied onto the conveyor; and
      if the first sensing system confirms movement of the belt but the second sensing system does not confirm an object, the microprocessor provides a signal to open the lubricant applicator so that a second amount of lubricant is fed from the lubricant source and is applied to the conveyor, the second amount of lubricant being less than the first amount; and
      if the first sensing system does not confirm movement, the microprocessor does not provide a signal to open the lubricant applicator.

2. The combination system according to claim 1, wherein the lubricant applicator comprises a spray nozzle.

3. The combination system according to claim 1, wherein the detergent applicator comprises a spray nozzle and the mixer comprises a mixing chamber.

4. The combination system according to claim 1, wherein the system comprises two zones, wherein each zone comprises a conveyor; a solenoid, a valve and a controller configured and arranged to control the lubricant; and a solenoid, a valve and a controller configured and arranged to control the cleaning solution.

5. The combination system according to claim 1, wherein the system comprises two or more zones, wherein each zone comprises a conveyor; a solenoid, a valve and a controller configured and arranged to control the lubricant; and a solenoid, a valve and a controller configured and arranged to control the cleaning solution.

6. The combination system according to claim 5, wherein the two or more zones are arranged between a filler station and a caser station.

7. The combination system of claim 1 wherein the microprocessor for the cleaning system is the same as the microprocessor for the lubricating system.

8. A conveyor lubricating system for application of lubricant onto a conveyor system, the conveyor system used for moving items on a belt and having a track, the lubrication system comprising:

a lubricant source, a lubricant applicator for application of the lubricant onto the track, and a control system, the control system comprising:

(i) a first sensing system to sense movement of the belt;
   (ii) a second sensing system to sense presence of items on the belt;
   (iii) a microprocessor to open the nozzle to spray lubricant onto the belt;

wherein if the first sensing system confirms movement of the belt and the second sensing system confirms an object, the microprocessor provides a signal to open the lubricant applicator so that a first amount of lubricant is fed from the lubricant source and is applied onto the track; and if the first sensing system confirms movement but the second sensing system does not confirm an object, the microprocessor provides a signal to open the lubricant applicator so that a second amount of lubricant is fed from the lubricant source and is applied to the track, the second amount of lubricant being less than the first amount; and if the first sensing system does not confirm movement, the microprocessor does not provide a signal to open the lubricant applicator.

9. The conveyor lubricant system according to claim 8, wherein the lubricant applicator is a spray nozzle.

* * * * *